Patented July 10, 1951

2,560,296

UNITED STATES PATENT OFFICE 2,560,296

PREPARATION OF THIOAMIDES

Charles L. Levesque, Philadelphia, Pa., assignor to Rohm & Haas Company, Philadelphia, Pa., a corporation of Delaware No Drawing. Application August 20, 1948, Serial No. 45,431

4 Claims. (Cl. 260—551)

This invention relates to a process for preparing thioamides. The process comprises reacting under anhydrous conditions and at a temperature of 100° C. to 200° C. (a) sulfur and (b) a secondary or a tertiary amine which has two hydrogen atoms on a carbon atom contiguous to the amino-nitrogen atom.

The amines which can be reacted with sulfur to produce thioamides by the process of this invention have the general formula

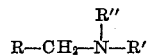

in which R represents an alkyl or cycloalkyl group, R' represents a hydrocarbon group, and R'' represents a hydrogen atom or a hydrocarbon group. These secondary and tertiary amines react with sulfur according to the following equation:

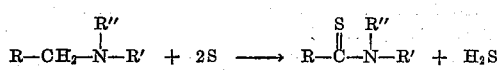

It will be noted that reaction takes place between the sulfur and the hydrogen atoms on the methylene group contiguous to the amino-nitrogen atom.

The hydrocarbon groups represented by R, R', and R'' in the general formula above are free of aliphatic or non-benzenoid unsaturation and preferably contain a maximum of 18 carbon atoms each. That is, the groups do not contain double bonds between carbon atoms in the aliphatic portions, although double bonds of the benzenoid type can be present such as those in aromatic cyclic groups typified by phenyl or tolyl groups. The alkyl or cycloalkyl groups represented by R above are exemplified by the following: Methyl, ethyl, isopropyl, tertiary-amyl, decyl, dodecyl, octadecyl, cyclohexyl, cyclohexylmethyl, and the like as well as the isomers thereof. R'' may represent a hydrogen atom, in which case the amine is secondary. Alternatively, it may represent an alkyl, cycloalkyl, aryl, or aralkyl group in which case the amine is a tertiary one. Examples of alkyl and cycloalkyl groups which are represented by R'' are given above in connection with the description of the character R. In addition, the phenyl, tolyl, naphthyl, anthracyl, and phenylethyl groups exemplify operable aryl and alkaryl and aralkyl groups represented by R''. The character R' represents the same hydrocarbon groups as does R''. The reaction of amine and sulfur is much more efficient when the hydrocarbon groups in the amine as represented by R, R', and R'' contain a maximum each of 18 carbon atoms.

While the reaction of this invention takes place over the temperature range of 100° C. to 200° C., it is preferred to conduct the reaction between 120° C. and 160° C. for practical reasons. The reaction will occur even below 100° C. but the rate is very slow. On the other hand, temperatures above 200° C. bring about the formation of tarry by-products which contaminate the monothioamide and reduce the yield thereof.

The reaction can be carried out at sub- or superatmospheric pressures although ordinarily atmospheric pressure suffices. Superatmospheric pressures are employed when the amine is objectionably volatile, and subatmospheric pressures are employed to remove the hydrogen sulfide and enhance the production of thioamide provided the temperatures can be maintained above 100° C. Thus, the use of pressures other than atmospheric is governed by the volatility of the amine.

The reaction is carried out in the presence of an inert organic solvent and the word "inert" is used in the accepted sense to indicate that the solvent does not react chemically with the reactants or products. Solvents for sulfur are particularly recommended and the best solvents are those which are slightly basic such as pyridine or dioxan. In every case the reaction is carried out under anhydrous conditions.

The following examples illustrate how thioamides are prepared by the process of this invention.

Example 1

Into a three-necked flask equipped with mechanical stirrer, thermometer, and reflux condenser was placed a mixture of 97 grams (0.75 mole) of dibutylamine, 48 grams (1.5 moles) of sulfur, and 200 cc. of pyridine. The mixture was refluxed and stirred for 10 hours after which it was cooled and diluted with 400 cc. of chloroform. The resultant solution was washed successively with water, dilute hydrochloric acid, and water. The chloroform was then stripped off and the residue fractionated. A yield of 67.2 grams of a light yellow liquid boiling at 142°–144° C. and 6 mm. pressure was obtained. This liquid was redistilled and analysis showed it to have the structural formula

(Calculated: Carbon=60.3%; hydrogen=10.7%; and nitrogen=8.79%
Found: Carbon=60.1%; hydrogen=10.66%; and nitrogen=8.68%)

Example 2

In a similar manner, a mixture of 75 grams (0.75 mole) of triethylamine, 48 grams (1.5 moles) of sulfur, and 200 cc. of pyridine was refluxed and stirred for 10 hours. It was then cooled, diluted with 400 cc. of chloroform, washed and distilled as described above. A fraction, boiling at 102°–105° C. and 4.5 mm. was obtained which was shown by analysis to have the formula

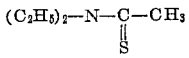

(Calculated: Carbon=54.9%; hydrogen=9.93%; and nitrogen=10.7%
Found: Carbon=55.1%; hydrogen=10.0%; and nitrogen=10.6%)

In exactly the same way a compound having the formula

was prepared from a mixture of 135 grams (0.5 mole) of dinonylamine, 40 grams (1.25 moles) of sulfur, and 200 cc. of dioxan.

The thioamides of this invention are useful as intermediates, insecticides, and accelerators.

I claim:

1. A process for preparing thioamides having the general formula

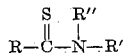

in which R and R'' represent alkyl groups of 1 to 18 carbon atoms and R'' represents a member of the class consisting of a hydrogen atom and alkyl groups of 1 to 18 carbon atoms, which process consists of chemically reacting under anhydrous conditions at a temperature of 100° C. to 200° C. and in the presence of an inert organic solvent (a) sulfur and (b) an amine having the general formula

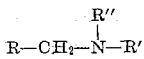

in which R, R' and R'' are identical with the same characters described above.

2. A process for preparing thioamides having the general formula

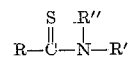

in which R and R'' represent alkyl groups of 1 to 18 carbon atoms and R'' represents a member of the class consisting of a hydrogen atom and alkyl groups of 1 to 18 carbon atoms, which process consists of chemically reacting under anhydrous conditions at a temperature of 120° C. to 160° C. and in the presence of an inert organic solvent (a) sulfur and (b) an amine having the general formula

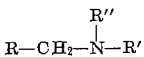

in which R, R' and R'' are identical with the same characters described above.

3. The process of preparing thioamides having the general formula

in which R and R' are alkyl groups of 1 to 18 carbon atoms, which consists of reacting under anhydrous conditions (a) sulfur and (b) a secondary amine having the general formula

R—CH$_2$—NH—R' in which R and R' have the above significance at a temperature of 120° C. to 160° C. in the presence of an inert organic solvent.

4. The process of preparing thioamides having the general formula

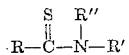

in which R, R' and R'' each represents an alkyl group of 1 to 18 carbon atoms, which consists of reacting under anhydrous conditions (a) sulfur and (b) a tertiary amine having the general formula

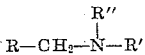

in which R, R' and R'' have the above significance at a temperature of 120° C. to 160° C. in the presence of an inert solvent.

CHARLES L. LEVESQUE.

REFERENCES CITED

The following references are of record in the file of this patent:

UNITED STATES PATENTS

| Number | Name | Date |
|---|---|---|
| 2,495,567 | Carmack et al. | Jan. 24, 1950 |

OTHER REFERENCES

Wallach: Liebig's Annalen, vol. 259 (1890), pp. 300 to 305.

Adams et al.: Organic Reactions, vol. III (1946), pp. 107, 85.

Carmack et al.: J. Am. Chem. Soc., vol. 68, October 1946, pp. 2030–2031.

King et al.: J. Am. Chem. Soc., vol. 68 (1946), pp. 2335 to 2339.

McMillan: J. Am. Chem. Soc., vol. 70, 1948, pp. 868–869.